United States Patent
Garcia Martin et al.

(10) Patent No.: US 8,797,875 B2
(45) Date of Patent: Aug. 5, 2014

(54) POLICY CONTROLLED OFFLOADING AMONG NEIGHBORING NETWORKS

(75) Inventors: Miguel Angel Garcia Martin, Pozuelo de Alarcon (ES); Pablo Martinez De La Cruz, Madrid (ES); Alberto Mozo Velasco, Madrid (ES); Patricia Sánchez Cantón, Madrid (ES); Alberto Vaca Escribano, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 344 days.

(21) Appl. No.: 13/235,092

(22) Filed: Sep. 16, 2011

(65) Prior Publication Data
US 2013/0070594 A1 Mar. 21, 2013

(51) Int. Cl.
*H04L 12/26* (2006.01)

(52) U.S. Cl.
USPC .......................... 370/235; 370/328; 370/338

(58) Field of Classification Search
None
See application file for complete search history.

(56) References Cited

U.S. PATENT DOCUMENTS

| | | | |
|---|---|---|---|
| 6,965,948 B1 * | 11/2005 | Eneborg et al. | 709/250 |
| 7,606,202 B2 * | 10/2009 | Marathe et al. | 370/331 |
| 7,957,350 B2 * | 6/2011 | Oulai et al. | 370/332 |
| 8,320,272 B2 * | 11/2012 | Kahn et al. | 370/252 |
| 8,331,236 B2 * | 12/2012 | Cavalli et al. | 370/235 |
| 8,331,979 B2 * | 12/2012 | Hamano et al. | 455/552.1 |
| 8,457,098 B2 * | 6/2013 | Yang et al. | 370/349 |
| 8,503,438 B2 * | 8/2013 | Lim et al. | 370/355 |
| 8,554,142 B2 * | 10/2013 | Hoover et al. | 455/41.2 |
| 8,626,143 B2 * | 1/2014 | Haughn | 455/418 |
| 8,694,018 B2 * | 4/2014 | Budic et al. | 455/453 |
| 2007/0280161 A1 | 12/2007 | Rudrapatna et al. | |
| 2009/0323530 A1 | 12/2009 | Trigui et al. | |
| 2011/0261695 A1 * | 10/2011 | Zhao et al. | 370/232 |
| 2012/0129517 A1 * | 5/2012 | Fox et al. | 455/425 |
| 2012/0135719 A1 * | 5/2012 | Haughn | 455/414.1 |
| 2012/0140651 A1 * | 6/2012 | Nicoara et al. | 370/252 |
| 2013/0039275 A1 * | 2/2013 | Patil et al. | 370/328 |
| 2014/0050086 A1 * | 2/2014 | Himayat et al. | 370/230 |
| 2014/0071925 A1 * | 3/2014 | Liu | 370/329 |

FOREIGN PATENT DOCUMENTS

| | | |
|---|---|---|
| WO | 2009149600 A1 | 12/2009 |
| WO | 2011149533 A1 | 12/2011 |

OTHER PUBLICATIONS

Open Mobile Alliance, "Enabler Release Definition for User Agent Profile", Approved Version 2.0, Jun. 25, 2007, pp. 1-13.
3rd Generation Partnership Project, "Technical Specification Group Services and System Aspects; Policy and charging control architecture (Release 11)", 3GPP TS 23.203 V11.2.0, Jun. 2011, pp. 1-142.

* cited by examiner

*Primary Examiner* — Michael J Moore, Jr.
(74) *Attorney, Agent, or Firm* — Coats and Bennett, P.L.L.C.

(57) ABSTRACT

Methods and apparatus are disclosed for controlling and distributing data traffic among neighboring access networks within a geographic area. Subscribers may be given different priorities. Requests of services by subscribers may be prioritized. Data traffic within a congested access network may be offloaded to alternate access networks based on criteria such as service types and Quality of Service requirements associated with the data traffic, subscriber priorities associated with the subscribers, software and hardware capabilities associated with the user terminals of the subscribers, and resource availabilities in the alternate access networks.

22 Claims, 11 Drawing Sheets

POLICY CONTROLLED OFFLOADING AMONG NEIGHBORING NETWORKS

TECHNICAL FIELD

The present invention relates generally to distributing and balancing data traffic among neighboring access networks.

BACKGROUND

Today's wireless communications technologies offer different radio access networks for a subscriber to connect to the core communications network. These different access networks include 3GPP access networks, such as High Speed Packet Access (HSPA) networks and LTE access networks, and non-3GPP access networks, such as Wireless Local Area Networks (WLAN) and Worldwide Interoperability for Microware Access (WiMAX) networks. A user terminal, also known as user equipment (UE), is often equipped with multiple interfaces that allow the user terminal to communicate with the core network via different access networks.

A user may also subscribe to different services. Based on the subscribed services, the user may be classified into one of different user classes. For example, the user could be classified to the "gold," "silver," or "bronze" user class, depending on the subscribed services. Different user classes have different priorities, different cost structures, and different Quality of Service (QoS) guarantees. Subscribers assigned to a "gold" user class pay more than those of "silver" or "bronze" user class in return for faster connections, higher QoS, and more reliable services.

User terminals within the same geographic area compete for the network resources of the same access network. Regardless what services a user may subscribe to, the user may be denied service if the access network does not have enough resources to support the requested service. For example, user terminal A may be subscribed to a premium service, which assigns him to the "gold" user class and be granted access to a video streaming application that has a high QoS requirement. When user terminal A initiates a new video streaming service, the service initiation request may be denied if the access network is congested, even though user terminal A belongs to the "gold" user class and should be given a higher priority than those to whom the network resources are currently allocated.

In some scenarios, a user terminal of ultra importance may require exclusive use of the network resources in a particular access network. Other users of this particular access network need to be offloaded to alternate access networks.

Accordingly, there is a need to prioritize users and offload users from one access network to alternate access networks based on priorities.

SUMMARY

The present invention relates to methods and apparatus for making network resources available for prioritized users in a wireless communication network. In a geographic area where one or more alternate networks to the wireless communication network are available, one or more user terminals with established packet flows can be offloaded to an alternate network to make more resources available for the prioritized users. When a user terminal initiates a service request in a wireless communications network, some of these user terminals that are capable of accessing at least one of the alternate networks may be offloaded to the alternate networks to accommodate the service request. Offloading of some user terminals to alternate networks may be carried out in reaction to a failed service request. Offloading of some user terminals to alternate network may also be carried out proactively in response to a user terminal initiating a service request.

A Policy and Charging Rules Function (PCRF) node or other network node performs the evaluation and selection of candidate user terminals for offloading to alternate networks. The PCRF node interacts with other networks nodes and database servers to obtain subscriber information, capabilities, and available networks for the user terminals located in the concerned area. Based on the subscriber information, the access network technologies supported by the user terminals, and the networks that are available to the user terminals in a particular geographical area, the PCRF node selects potential packet flows and corresponding user terminals to be offloaded and formulates a new set of rules or policies for the candidate user terminals. The new rules or policies are pushed down to the user terminals by the PCRF node through other intermediary network nodes.

The invention allows an operator to control and distribute the packet flows of subscribers in a certain geographical area through all the available access networks, based on the subscribers' user classes, thus maximizing the service delivery and prioritizing the most valuable subscribers. In particular, an operator can provide services (e.g., IP connectivity) to highly valuable users (e.g., those belonging to the "gold" user class) even when the network is congested. This benefit is achieved by selecting candidates IP flows pertaining to lower priority users for offloading to alternate access networks, so that the intended access network becomes available for admitting the IP flows established by valuable customers, that is, customers with higher offloading priority or higher user class. In some embodiments of the invention the offloading priority is explicitly defined for each user independently of the user class, whereas in others the offloading priority is implicitly derived from the user class. Moreover, the PCRF may be configured to set a final offloading priority for offloading user terminals to alternate networks based on the combination of both the explicitly defined offloading priority and the user class.

DETAILED DESCRIPTION

The present application relates to methods and apparatus for balancing and redistributing traffic among several neighboring radio access networks and for alleviating congestion in a radio access network. By offloading some packet flows with low priority from a first radio access network to an alternate access network, access to network resources and services can be guaranteed to subscribers with high priority.

Figure 1:
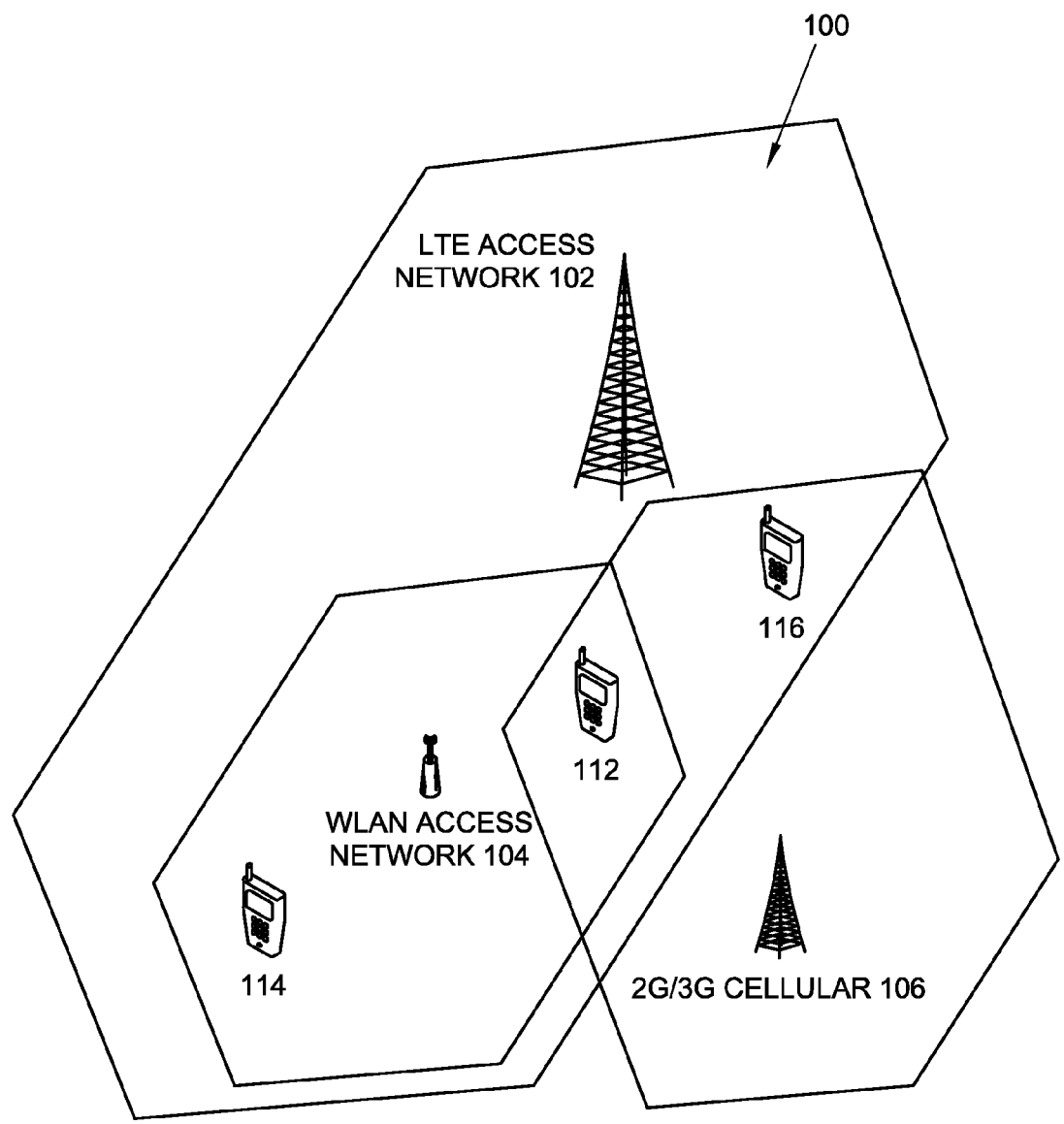
FIG. 1 illustrates a geographic area covered by multiple access networks.

FIG. 1 illustrates a wireless communication network 100 comprising three radio access networks: a LTE access network 102, a WLAN access network 104, and a 2G/3G cellular access network 106. A user terminal 112 and a user terminal 114 are within the coverage of both the LTE access network 102 and the WLAN access network 104. A user terminal 116 is under the coverage of the LTE access network 102 and the 2G/3G cellular access network 106. The user terminal 112 is also under the coverage of the 2G/3G cellular access network 106. The user terminal 112 can use all three access networks to connect to the wireless communications network. The user terminal 114 can use either the LTE or WLAN access network to connect to the network. The user terminal 116, however, can rely on the LTE access network 102 or 2G/3G cellular access network 106 to connect to the network.

Assume that the user terminal 114 is operated by a user belonging to the "gold" user class. This user desires to initiate a video streaming application with the LTE access network 102. Further assume that user terminals 112 and 116 with lower priority have established packet flows with the LTE access network 102. If the LTE access network 102 is congested, the service request by user terminal 114 to initiate a video streaming application may be denied. In embodiments of the present invention, the network can offload packet flows of user terminal 116 to 2G/3G cellular network 106. The packet flows of user terminal 112 could be offloaded to either the WLAN access network 104 or the 2G/3G access network 106. Thus, resources within the LTE access network 102 can be freed for use to fulfill the service request of user terminal 114.

Figure 2:
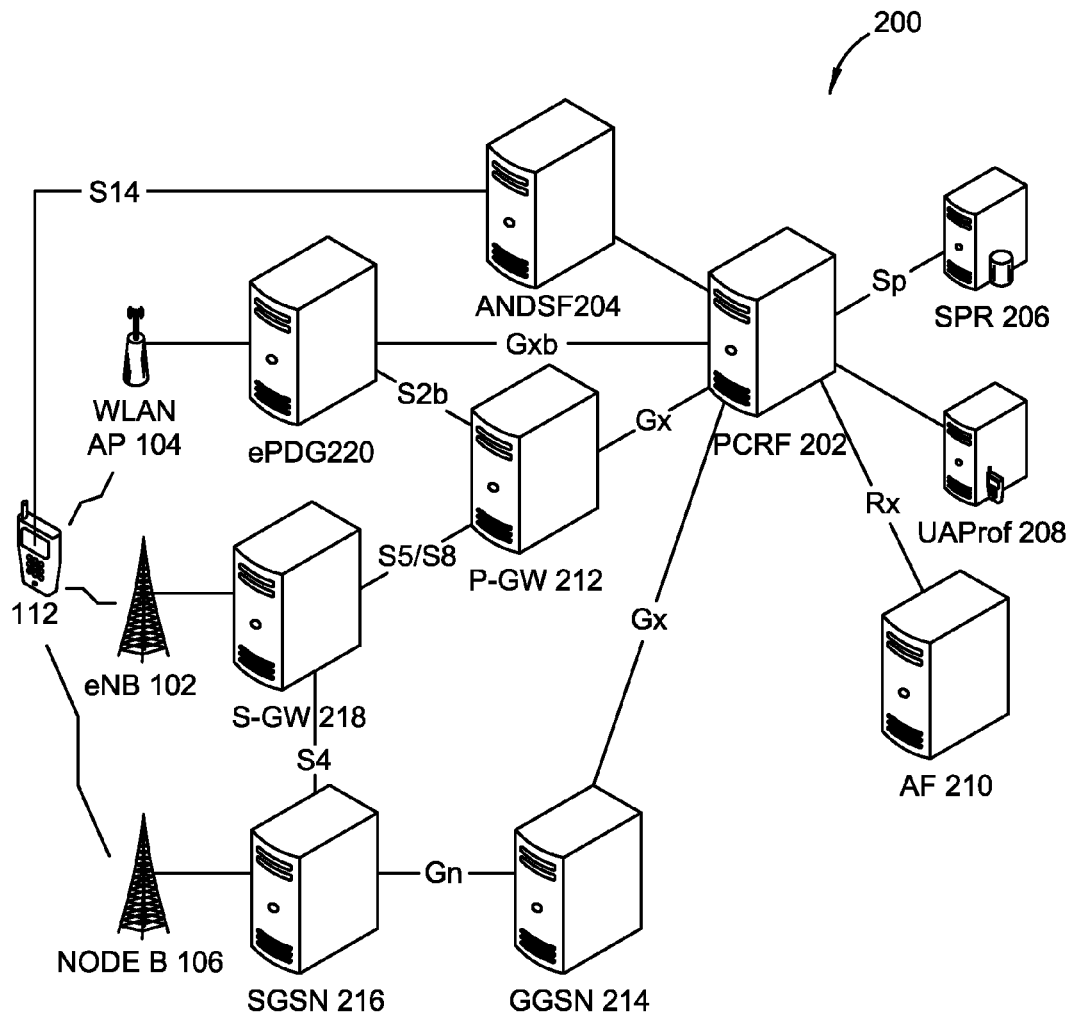
FIG. 2 illustrates an exemplary architecture of a wireless communications network that implements functions related to access network discovery and selection and policy and charging control.

FIG. 2 illustrates the policy and charging control (PCC) architecture for the wireless communications network 100 according to one exemplary embodiment. The wireless communication network 100 comprises a packet core network 200 and three radio access networks: the LTE access network 102, the WLAN access network 104, and the 2G/3G cellular access network 106. User terminals in the LTE access network 102 connect to a serving Gateway (S-GW) 218. User terminals in the WLAN access network 104 connect to an Evolved Package Data Gateway (ePDG) node 220. The S-GW 218 and ePDG 220 in turn connect to a Packet gateway (P-GW) 212. User terminals in the 2G/3G network 106 connect to a Serving GPRS Support Node (SGSN) 216, which in turn connects to a Gateway GPRS Support Node (GGSN) 214.

The Policy and Charging Rules Function (PCRF) 202 is the central policy controller within the PCC architecture. The PCRF 202 implements policy control decisions and flow-based charging control functionalities to ensure efficient allocations of network resources. Rules and policies determined by the PCRF 202 are enforced by Policy Control Enforcement Functions (PCEFs) to ensure proper allocation of network resources. For example, the P-GW 212 functions as the PCEF node for the LTE access network 102 and terminates the Gx reference point for the LTE access network 102 and the WLAN access network 104. The ePDG node 220 functions as the PCEF node for the WLAN access network 104 and terminates the Gxb reference point for the WLAN access network. The GGSN 214 functions as the PCEF node in the 2G/3G cellular network 106 and terminates the Gx reference point for the 2G/3G access network 106. The PCRF and PCEF functions are described in 3GPP TS 23.203.

Other nodes in the PCC architecture include an Access Network Discovery and Selection Function (ANDSF) node 204, a Subscription Profile Repository (SPR) node 206, a User Agent Profile (UAProf) node 208 and an Application Function (AF) node 210.

The functions of an ANDSF node are defined in 3GPP standards, Rel. 8. An ANDSF node assists user terminals to discover non-3GPP networks and provides to user terminals rules connecting to those networks. The ANDSF 204 can provide to a user terminal the following information:

Inter-System Mobility Policy (ISMP)—rules for selecting an access network when there is no more than one active access network connection;

Inter-System Routing Policy (ISRP)—rules for selecting an access network when there are more than one active access network connection.

Discovery Information—a list of access networks available in the vicinity of the user terminal and other information that may facilitate connection by the user terminal to the available access networks.

The ANDSF 204 communicates directly with user terminals via an S14 interface to push to the user terminals rules or policies concerning discovery, selection, and connection to an available access network. Based on the rules and information provided by an ANDSF, and other information such as network operator policies and user preferences, a user terminal can switch or offload one or more packet flows from one access network to another.

The SPR node 206 provides the PCRF node 202 with subscriber related information for subscription-based policies, and other bearer-level PCC rules. The PCRF 202 queries the SPR over the Sp interface.

The AF node 210 provides the PCRF node 202 with session information related to specific applications. The PCRF 202 communicates with the AF over the Rx interface.

The User Agent Profile (UAProf) node 208 is a database that holds information regarding user terminal capabilities, for instance, the types of access networks and the range of frequencies supported by a user terminal.

Figure 3:
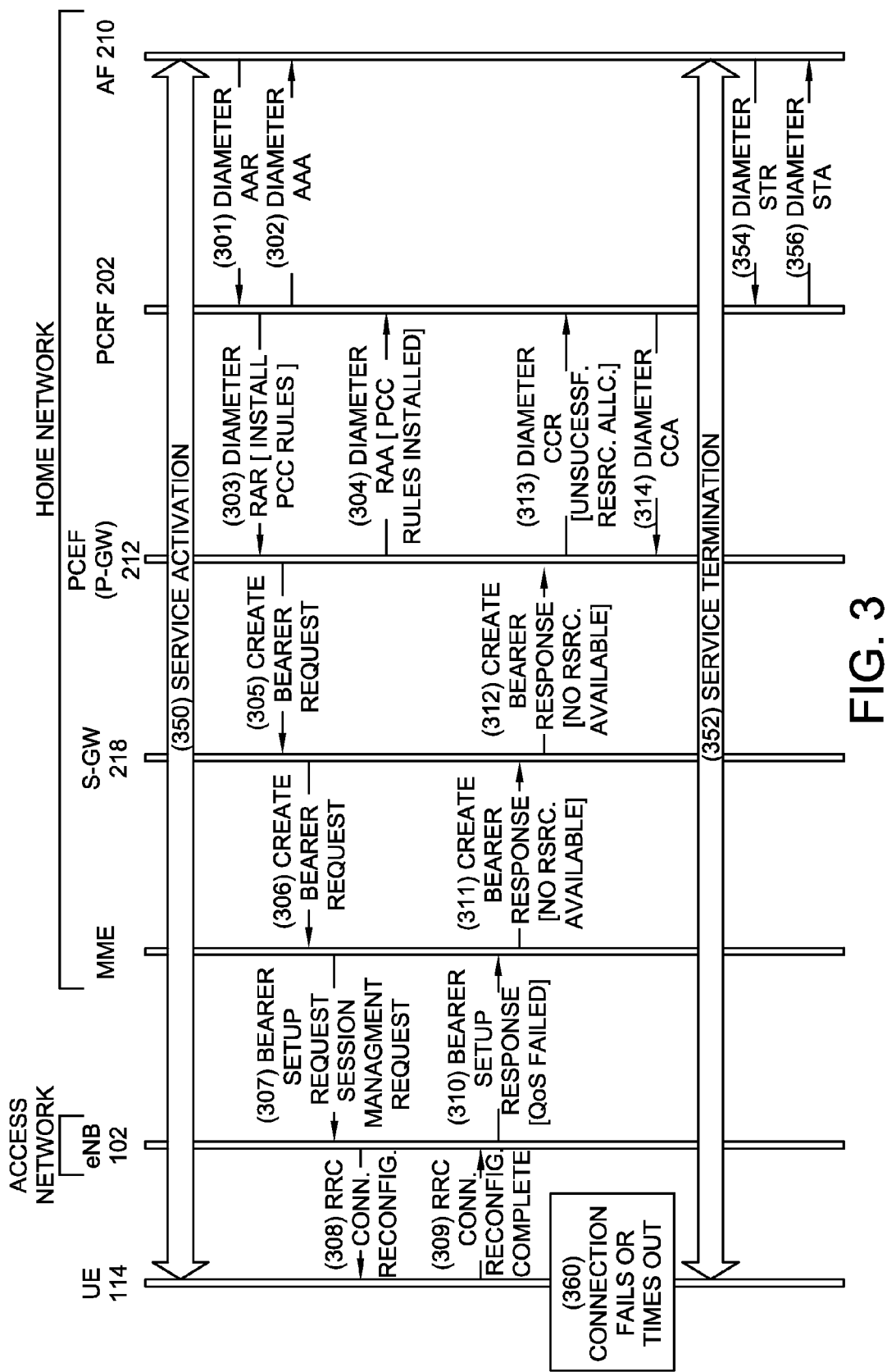
FIG. 3 illustrates an exemplary messaging flow during an establishment of a video streaming session.

FIG. 3 illustrates an offloading scenario in which the user terminal 114 is attempting to start a video streaming application with a streaming server (not shown). The user terminal 114 activates the video streaming service using Real Time Streaming Protocol (RTSP) (step 350). The AF node 210 sends a request to the PCRF node 202 to start the video stream service (step 301), and receives an acknowledgement (step 302). The request includes details about the requested video streaming service. The PCRF node 202 derives certain policy control and charging (PCC) rules regarding the video streaming service and forwards the rules to the P-GW 212 (step 303) and receives an acknowledgement (step 304). The P-GW 212 initiates bearer establishment for the user terminal 114 (steps 305-308). The methods for bearer establishment are well-known in the art and such details are not material to the invention.

The user terminal 114, or the LTE access network 102, determines that it is unable to provide the requested QoS. In the scenario shown in FIG. 3, the user terminal 112 reports the failure to initiate a service request to the P-GW 212 (steps 309-312). The P-GW 212 reports the failure to the PCRF 202 (step 313) and receives an acknowledgement (step 314). In the meantime, the user terminal 114, detecting that the service delivery from the video streaming server has failed (step 360), for example, due to timeout, initiates session termination procedures with the AF node 210, which, in turn, terminates the session with the PCRF 202. As a result, the user terminal 114 is unable to establish a connection for the video streaming application, for example, because of the congested network, and/or because of the high QoS requirement of the video streaming application.

In the above described scenario, the user terminal 114 would fail in initiating a video service no matter what user class the user operating the user terminal 114 has. As certain user class subscriptions promise their subscribers higher quality of service or even guaranteed services, it is desirable in the above described scenario that the user terminal 114 be allowed to proceed with the video streaming application, even in a congested network.

According to embodiments of the present invention, the delivery of guaranteed services requested for a user terminal with a high priority in a congested access network is enabled by using an offloading technique. The offloading technique diverts a set of already established flows for users with lower priority to an alternate access network. The resources freed up by offloading the lower priority packet flows can then be used to meet the service requirements for the high priority users.

The offloading technique can also be used in cases when the network is not congested, for example, to provide exclusive use of one access network to highly important users, such as government agencies in emergency situations.

Figure 4:
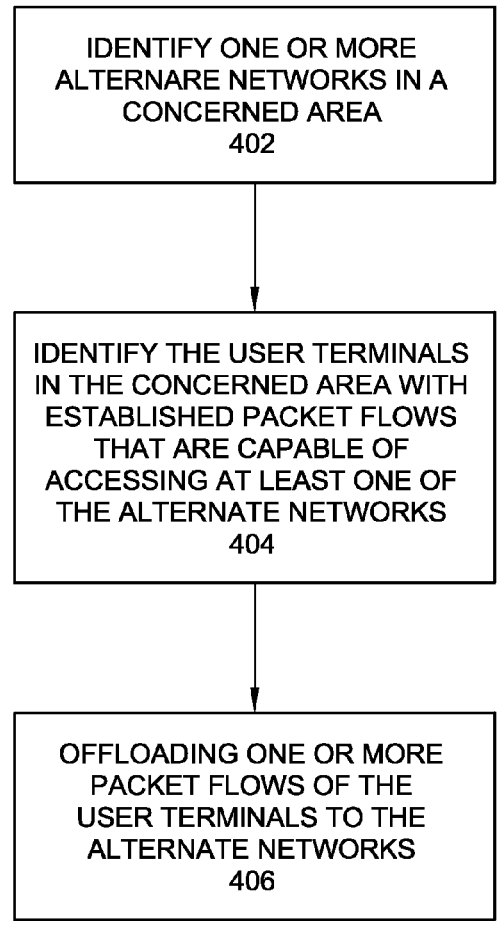
FIG. 4 illustrates a flow chart of an exemplary offloading process.

The offloading technique involves three main steps as shown in FIG. 4. First, one or more alternate networks in a concerned area are identified (step 402). Second, the user terminals in the concerned area with established packet flows that are capable of accessing at least one of the alternate networks are identified (step 404). Third, one or more established packet flows of the identified user terminals are offloaded to one of the alternate networks (step 406).

The determination of which user terminals and corresponding packet flows are to be offloaded (steps 402 and 404) is carried out at the PCRF 202 through policies and rules formulation by taking into account the offloading priority, the user class, or both. In determining the packet flows to be offloaded, the PCRF 202 examines the Quality of Service (e.g., bandwidth, guaranteed packet loss, etc) associated with each of the packet flows for lower priority user terminals in the concerned area. The PCRF 202 may also calculate the aggregated QoS of the packet flows to be offloaded to ensure that the aggregated QoS of the packet flows is equal to or greater than the QoS requested by the incoming packet flow. The formulated policies and rules are then forwarded to and implemented by the various PCEF nodes.

Figure 5:
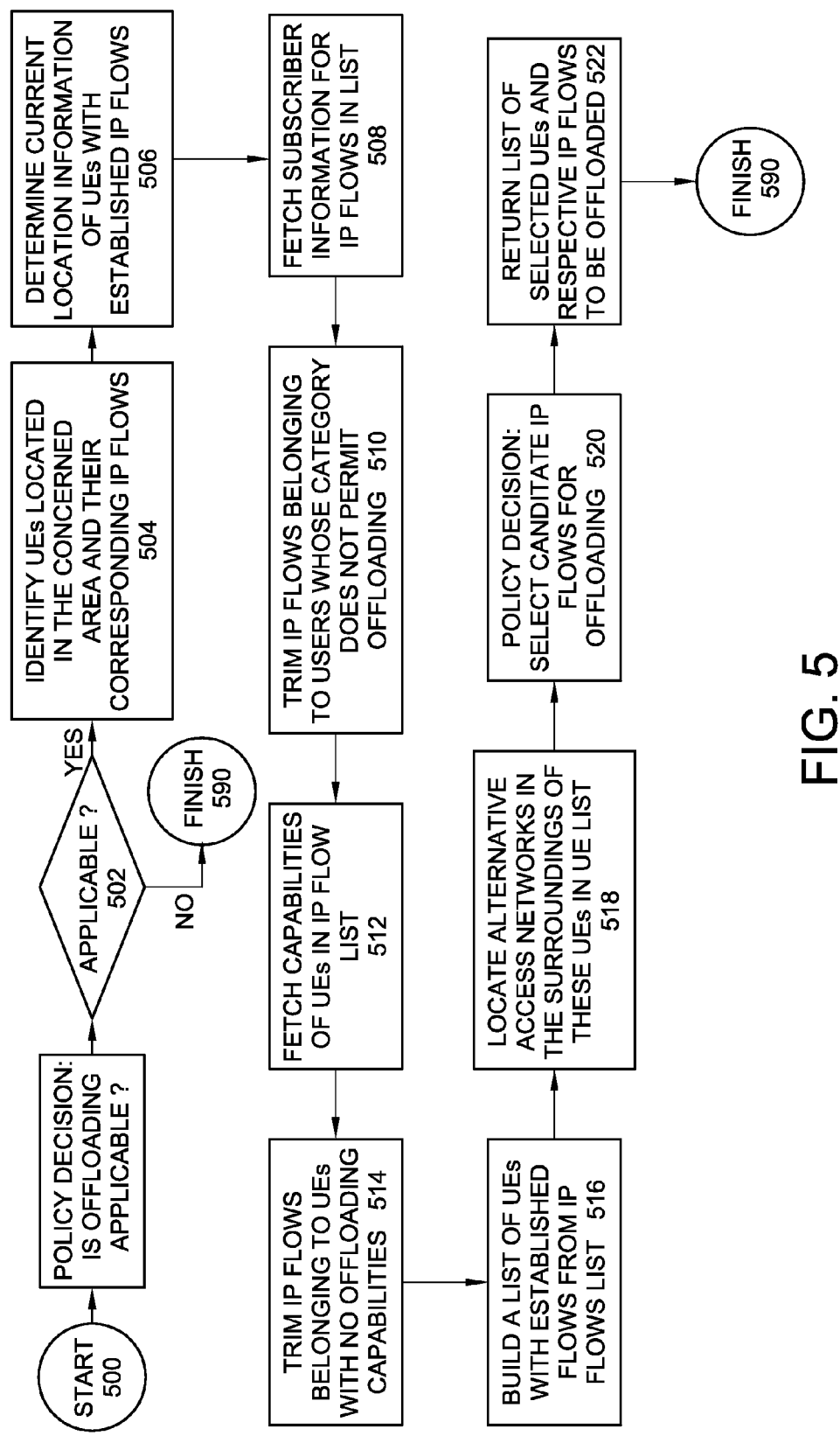
FIG. 5 illustrates a flow chart of a selection process in which candidate packet flows are selected for offloading to an alternate network.

FIG. 5 is a detailed flow chart illustrating the selection of user terminals and their corresponding packet flows that are to be offloaded to an alternate network. The offloading method can be invoked in response to a failed service request by a user terminal. Alternative, the offloading technique can be invoked in response to a service request initiated by a user terminal. For example, the user of the terminal may be granted a user class that gives him exclusive use of one particular access network. The former scenario is referred to as the reactive scenario and the latter is referred to as the proactive scenario. The offloading method can be administratively enabled or disabled for the proactive scenario only, the reactive scenario only, or for both scenarios.

As shown in FIG. 5, the PCRF 202 first makes the preliminary determination of whether offloading is applicable (step 502). The offloading method can be enabled or disabled administratively in the PCRF 202. More specifically, the method can be enable or disabled for the proactive scenario only, the reactive scenario only, for both scenarios. If the offloading method is disabled, the process terminates and the regular policy control and charging procedures of the PCRF 202 apply (step 590). If offloading is enabled, the selection process proceeds.

The next step in the selection process of FIG. 5 is to identify the user terminals located in the concerned geographic area and their corresponding packet flows (step 504). The concerned area is an area (cell, routing area, or similar) of a given access network technology where the user terminal that is trying to establish a new IP flow is currently located. In the reactive scenario this area may, for example, have reported congestion when trying to admit the new IP flow that triggers the mechanism described in this invention.

The PCRF 202 maintains a list of current packet flows, along with the corresponding user terminals. At the time when a packet flow of a user terminal is established, the PCRF 202 stores the location information of the user terminal associated with the packet flow. The PCRF 202 determines an initial list of user terminals whose location information indicates the user terminals are within the concerned area. The PCRF 202 determines the identity of a user terminal in the concerned area by relating the packet flow to the user (e.g., MSISDN, IMSI) of the user terminal and/or to the user terminal (e.g., IP address, IMEI). The location information of a user terminal maintained by the PCRF 202 may be outdated, because the user terminal may have moved to a different area since the packet flow was established. Therefore, once the initial candidates for offloading are identified, the PCRF 202 determines a current location for each user terminal (step 506).

In one embodiment, the PCRF 202 retrieves the current location information for the user terminals from nodes that maintain such information, for example, the ANDSF 204 or a positioning server. The PCRF 202 uses the current location information retrieved from the ANDSF 204 or from the positioning sever to update the list of user terminals identified in step 504 by removing from this list those user terminals whose current locations are outside of the concerned area (step 506). As a result, the PCRF 202 obtains a list of candidate user terminals.

The PCRF 202 fetches subscriber information for the candidate user terminals (step 508). The subscriber information may reside in the PCRF 202 itself or in the SPR 206, or some other external nodes. Such information includes user classification (for instance, gold/silver/bronze), monthly caps, operator specific data, etc. Based on the subscriber information, the PCRF 202 further reduces the list of candidate user terminals. For example, offloading may be prohibited for users belonging to the "gold" user class, but be allowed for users with lower priority.

In some implementations, a new attribute, an explicit offloading priority, is added to the existing subscriber information. In other implementations, the offloading priority may be implicitly derived from the user class. Moreover, a final offloading priority may be determined by applying configurable rules to a combination of the explicit offloading priority and user class. The offloading priority may be used to indicate (1) whether a subscriber is allowed to offload other subscribers' packet flows to an alternate access network; and (2) whether the subscriber's packet flows are allowed to be offloaded to an alternative access network. The offloading priority may also be used to indicate the relative priority of a subscriber that is subject to offloading. Thus, a subscriber with low priority cannot offload a user with a higher priority. The offloading priority may be used in addition to, or in place of the user class previously discussed. As discussed above, in some implementations, the offloading priority may be derived or inferred from the user class where the user belongs to. Based on the offloading priorities, the PCRF 202 can trim the list by removing the user terminals that belong to the subscribers that are not subject to offloading, for instance, subscribers belonging to the "gold" user class (step 510).

The list of the candidate packet flows can be further trimmed by removing those packet flows associated with the user terminals that do not have the offloading capabilities (step 512 and 514). The PCRF 202 fetches the capabilities of each user terminal in the list by querying the UAProf repository 208 to determine which user terminals support multiple access network technologies (step 512). Alternatively, the PCRF 202 can determine the access network technologies supported by a user terminal based on the user terminal vendor and model from information stored in the PCRF 202 itself, or from information retrieved from the SPR 206. The PCRF 202 can trim the list obtained in step 506 by removing the user terminals that do not support multiple access network technologies, and therefore, can not be offloaded, as shown in step 514. As a result, the PCRF 202 obtains a list of user terminals that are currently located in the concerned area, that have established packet flows, and whose packet flows are suitable for offloading (step 516).

To select among the user terminals remaining in the list, the PCRF 202 ascertains alternate access networks available for each user terminal (step 518) and then finalizes the list of candidate packet flows that are to be offloaded (step 520). The PCRF 202 interacts with the ANDSF 204 in order to determine available access networks in the surroundings of the user terminals in the list. It is worth noting that a set of user terminals within the same geographic area do not necessarily have the same access networks available. This is because different access technologies have different coverage. For example, as shown in FIG. 1, although the user terminals, 112, 114, and 116, are in the same geographical area, only the user terminals 112 and 114 are under the coverage of the WLAN access network 104. Relying on the information of the available access networks for each user terminal, the PCRF 202 can trim the list of candidate user terminals by removing those that do not have any available alternate access networks. The PCRF 202 can append the information of available access networks for each of the remaining user terminals in the list.

From the final list created in step 518, the PCRF 202 selects one or more packet flows belonging to one or more identified user terminals to be offloaded to an alternate access network (step 520). In order to honor the service request initiated by a user terminal of high offloading priority, the PCRF 202 ensures that the QoS of the requested service is equal or lower than the aggregated QoS of the established packet flows that are to be offloaded. The list of the candidate packet flows and their associated user terminals is then created (step 522). Policies and rules formulated based on the list of selected user terminals and corresponding packet flows are pushed by the PCRF 202 to various PCEF nodes for implementation.

Figure 6:
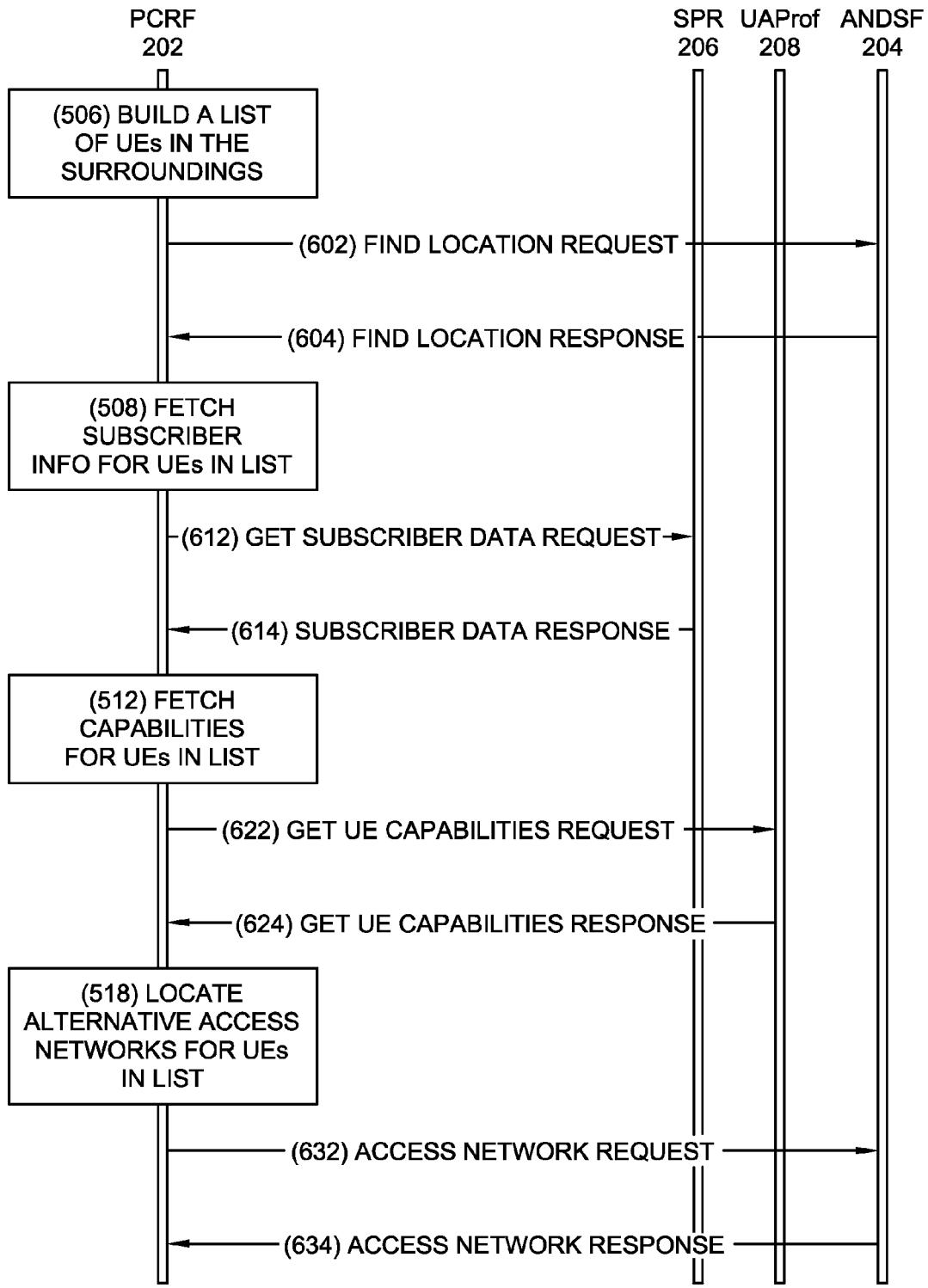
FIG. 6 illustrates an exemplary messaging flow in a selection process of candidate IP flows to be offloaded to an alternate network.

In the above described selection process, the PCRF 202 requires several different pieces of information in selecting candidate packet flows. The PCRF 202 retrieves the needed information from several external nodes during the selection process. For example, the PCRF retrieves current location information from the ANDSF 204. The PCRF also obtains information about alternate networks from the ANDSF 204. The PCRF 202 retrieves subscription information from the SPR 206, and information about user terminal capabilities from the UAProf 208. FIG. 6 illustrates four signaling operations for retrieval of information, such as current location information, subscription data, user terminal capabilities, and available access networks.

In step 506 of FIG. 5, the PCRF 202 determines the current location for each user terminal associated with the established packet flows. The PCRF 202 retrieves current location information of a user terminal by querying the ANDSF 204 or a positioning server or positioning platform. FIG. 6 shows that two new signaling messages are introduced to support the querying operation of current location information by the PCRF 202: message Find Location Request 602 and message Find Location Response 604. In the message Find Location Request 602, the PCRF 202 supplies the ANDSF 204 or other positioning server with a list of user terminals whose location information is requested. In the message Find Location Response 604, the ANDSF 204 or other positioning server returns the current location information associated with the user terminals included in the message Find Location Request 602. Additional information, such as the identity of the user of each user terminal (e.g., MSISDN, IMSI, etc.) may also be returned in the message Find Location Response 604.

In step 508 of FIG. 5, the PCRF 202 retrieves subscriber information associated with the established packet flows or their associated user terminals. The subscriber information is fetched from the SPR 206. FIG. 6 shows two new messages are introduced to facilitate the PCRF 202 to retrieve subscriber information for selected user terminals: the message Get Subscriber Data Request 612 and the message Subscriber Data Response 614. The signaling operation associated with subscriber information retrieval is implementation-dependant and may be LDAP-based or SQL-based, etc. In the message Get Subscriber Data Request 612, the PCRF 202 requests the SPR 206 to provide data about a subscriber (identified, e.g., by the MSISDN). The types and amount of data to be retrieved may be narrowed by using some form of filtering. In the message Subscriber Data Response 614, the SPR 206 returns the requested data to the PCRF 202. The format, nature, and amount of data vary depending on the implementation.

In step 512 of FIG. 5, the PCRF 202 fetches the user terminal capabilities from the UAProf 208 or similar repository. Typically, the UAProf 208 stores device capabilities in the form of XML files provided by the device manufacturer. These files can be stored in repositories, such as a web server or a database system and different signaling protocols may be used by the PCRF 202 to retrieve the information contained in those files. FIG. 6 shows two high-level messages are used for the operation of retrieving user terminal capabilities: message Get UE Capabilities Request 622 and message Get UE Capabilities Response 624. In the message Get UE Capabilities Request 622, the device types of the user terminals (e.g., maker and model) are identified by information known by the PCRF 202 or fetched from the SPR 206. In the message Get UE Capabilities Response 624, the UAProf 208 returns the device capabilities information, including the list of implemented access network technologies, back to the PCRF 202.

In step 518 of FIG. 5, the PCRF 202 retrieves from the ANDSF 204 information about available access networks for selected user terminals. As shown in FIG. 6, two new messages are introduced to facilitate the PCRF 202's operation of retrieving available access networks for the selected user terminals: message Access Network Request 632 and message Access Network Response 634. In the message Access Network Request 632, the PCRF 202 sends a list identifying one or more user terminals. In the message Access Network Response 634, the ANDSF 204 returns to the PCRF 202 a list of available access networks in the neighborhood of the user terminal.

Once the candidate packet flows for offloading are selected, the PCRF proceeds to offload the packet flows. More particularly, the PCRF 202 interacts with the ANDSF 204 to push the policy decisions to the ANDSF. The PCRF 202 interacts with the ANDSF 204 using two messages: the Push Access Network Request and Push Access Network Response. A Push Access Network Request is sent from the PCRF 202 to the ANDSF 204. It contains the following data items:
- a subscriber identity, identified by some identifier such as the MSISDN or IMSI.
- a list of affected packet flows established by the UE belonging to the aforementioned subscriber.
- a list of one or more alternate access networks that the UE belonging to the aforementioned subscriber should offload the aforementioned IP flows to.

The Push Access Network Response is sent from the ANDSF 204 to the PCRF 202 in response to a previous Push Access Network Request. The Push Access Network Response indicates to the PCRF 202 the success or the failure of honoring the previous Access Network Request message.

After receiving the policy decision from the PCRF 202, the ANDSF 204 communicates with the identified user terminals to execute the switching commands embodied in the policy decision from the PCRF 202. The switching commands indicate the packet flows that should be switched and the designated alternate access network.

As described earlier, the offloading process may be triggered either reactively or proactively. In the reactive scenario, the PCRF 202 triggers the offloading when the request for the establishment of the new packet flow(s) is denied due to a failure to provide the requisite Quality of Service by the underlying access network, for example, because of congestion in the selected access network. In the proactive scenario, the PCRF 202 can trigger offloading before detecting a service failure.

Figure 7A:
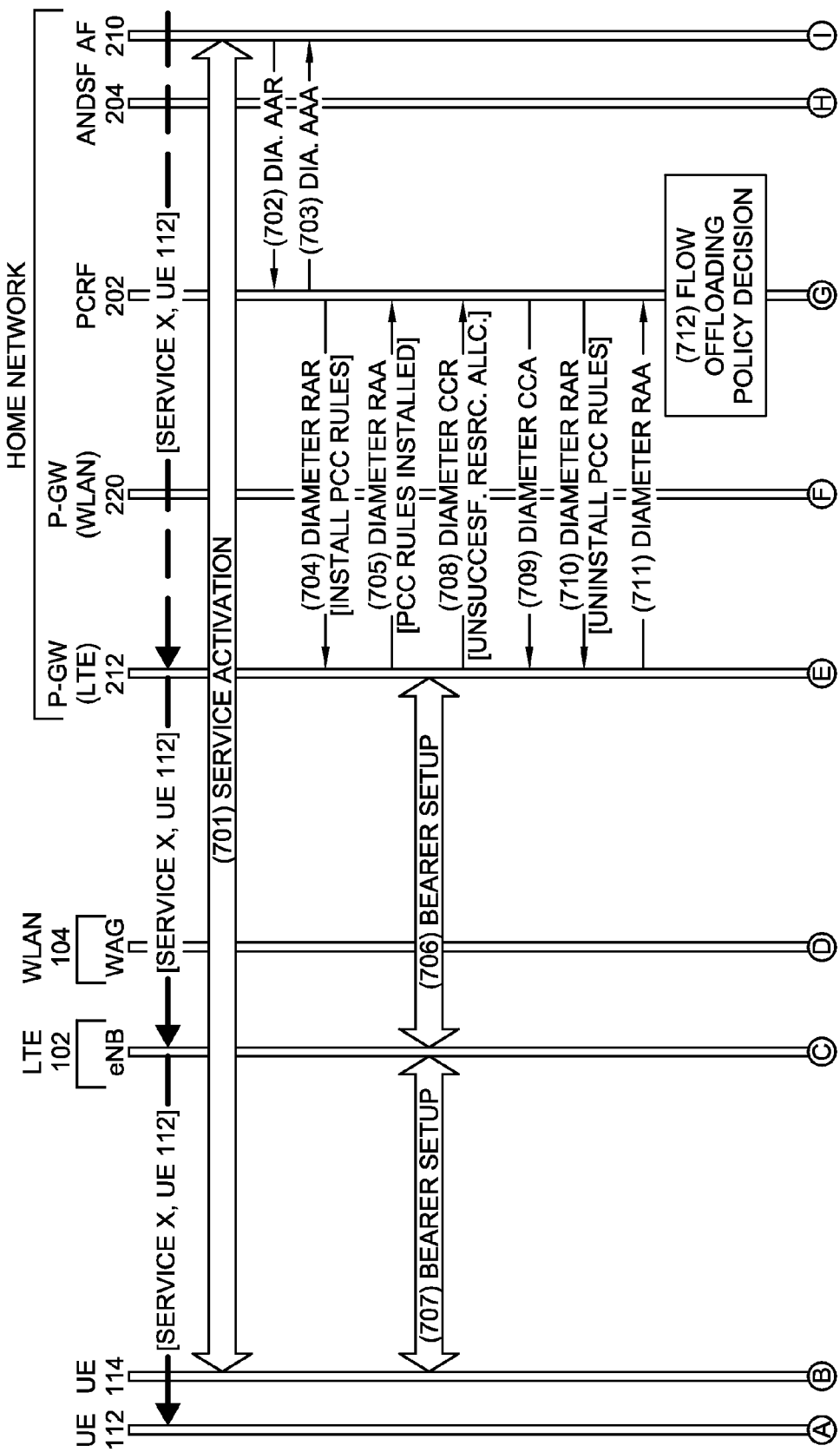
FIG. 7A illustrates a first part of an exemplary messaging flow in selecting potential user terminals to be offloaded to an alternate network in response to a failed service request initiated by a user terminal in a congested network.
Figure 7B:
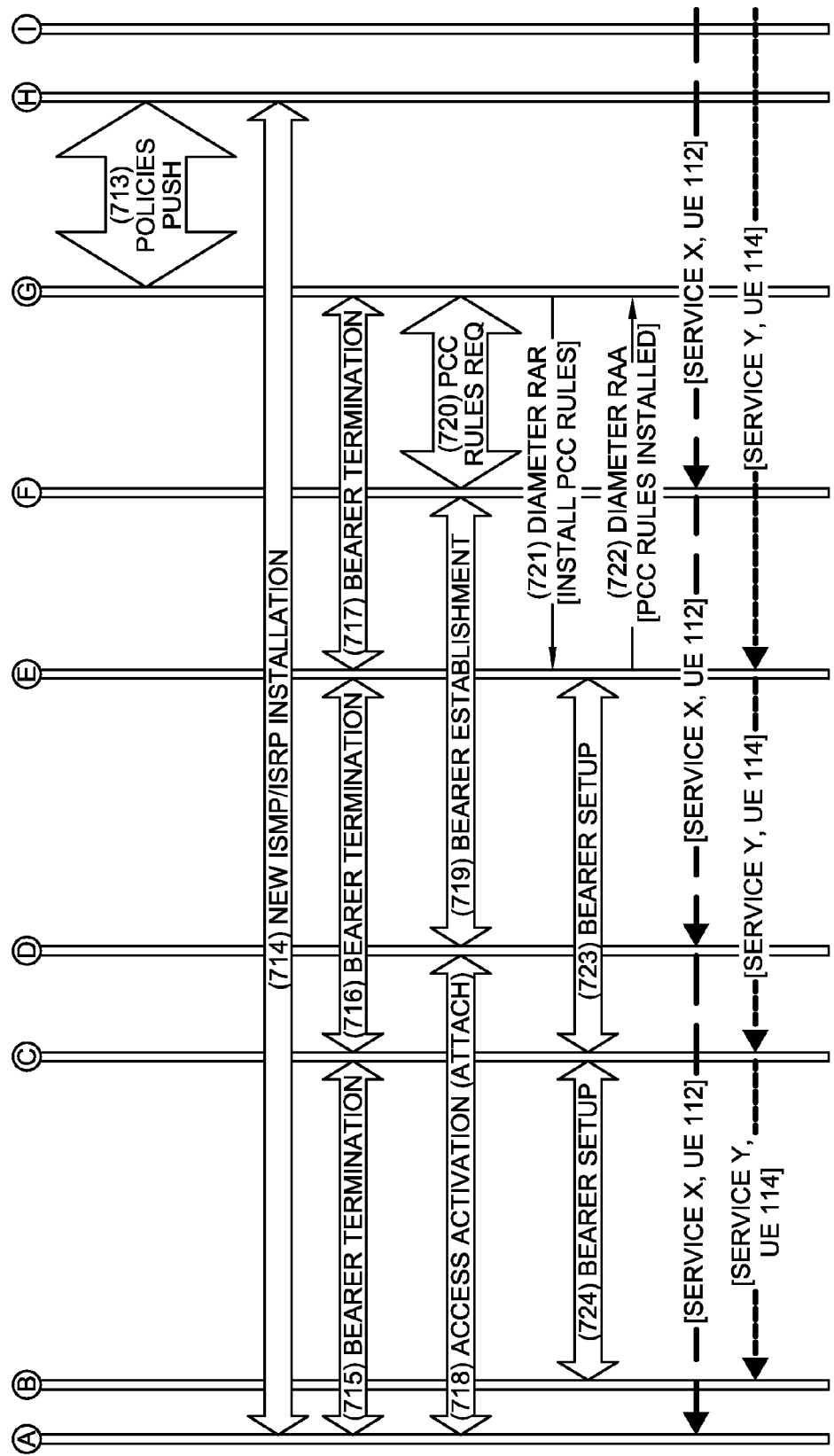
FIG. 7B illustrates a second part of an exemplary messaging flow in selecting potential user terminals to be offloaded to an alternate network in response to a failed service request initiated by a user terminal in a congested network.

FIGS. 7A and 7B illustrate the offloading process in a reactive scenario. In FIG. 7A, the user terminal 112 currently has one or more packet flows established for service X over the LTE access network 102, identified by a dashed line labeled [Service X, UE 112]. The user terminal 114 attempts to establish a new multimedia session. It initiates the service activation (701), for instance by using the Real Time Streaming Protocol to set up the media streaming flows against a streaming server (not shown). The AF 210 for the streaming server reports the session details to the PCRF 202 (step 702) and receives an acknowledgement (step 703).

The PCRF 202 derives PCC rules and installs them in the P-GW 212 (step 704). The P-GW signals the successful installation to the PCRF 202 (step 705). The P-GW 212 in the LTE access network 102 initiates signaling towards the LTE access network 102 by requesting the resource reservations, for example, requesting a dedicated bearer setup and receives an acknowledgement (steps 706 and 707). The bearer setup fails because it is not possible to provide the requested QoS to the user terminal 114, for example, due to congestion in the access network. The user terminal 114 or the eNB of the LTE access network 102 reports the failure to the P-GW 212, which, in turn, reports the failure to the PCRF 202 (step 708). The P-GW 212 receives an acknowledgement in return (step 709).

The PCRF 202 uninstalls the failed PCC rules from the P-GW 212 and receives an acknowledgement (steps 710 and 711). The failed service request by the user terminal 114 triggers the offloading process at the PCRF 202. To accommodate the service request, the PCRF 202 starts the offloading process by selecting suitable packet flows that can be offloaded and formulates a policy decision based on the selected candidate packet flows and their associated user terminals (step 712). The policy decision comprises a list of packet flows for one or more user terminals to be offloaded to some alternate access networks. The selected packet flows belong to user terminals other than the user terminal 114, which triggered the offloading process.

The PCRF 202 sends the policy decision to the ANDSF 204 in a Push Access Network Request (step 713). The ANDSF 204 acknowledges the receipt of this message and then pushes the new ISMP/ISRP to the identified user terminals (step 714). In FIG. 7B, only the pushing to the user terminal 112 is shown, although other terminals may be involved in the offloading process.

The user terminal 112 implements the ISMP/ISRP received. In this example, ISRP dictates that the selected packet flow(s) shall be moved to the WLAN access network 104. Accordingly, the user terminal 112 signals dedicated bearer termination to the P-GW 212 in the LTE access network 102, if applicable (steps 715 to 717) and initiates the attach to the WLAN access network (steps 718 to 720). Additionally, the user terminal 112 may perform some application level specific signaling to indicate to the AF 210 the change of access network.

After the offloading of one or more packet flows of the user terminal 112 is complete, the PCRF 202 attempts the reinstallation of the PCC rules in the P-GW 212 (steps 721 and 722). The P-GW 212 initiates signaling towards the LTE access network in requesting the resource reservations, for example, requesting a dedicated bearer setup (steps 723 to 724). This time, the bearer setup for the user terminal 114 succeeds since the congestion has been alleviated.

At the end of the offloading process, the user terminal 112 has some of its packet flows moved to the WLAN access network 104, identified by a dashed line labeled [Service X, UE 112]. The packet flows for the user terminal 114 is shown in FIG. 7B as a dotted line labeled [Service Y, UE 114].

In the above described reactive scenario, the offloading is triggered by a failed service request. In some cases, to allocate an access network for exclusive use by a special user terminal or avoid failed attempts of service initiation, the allocation of network resources can be proactively managed. In the proactive scenario, the PCRF 202 triggers the offloading before attempting to establish the requested IP flows.

Figure 8A:
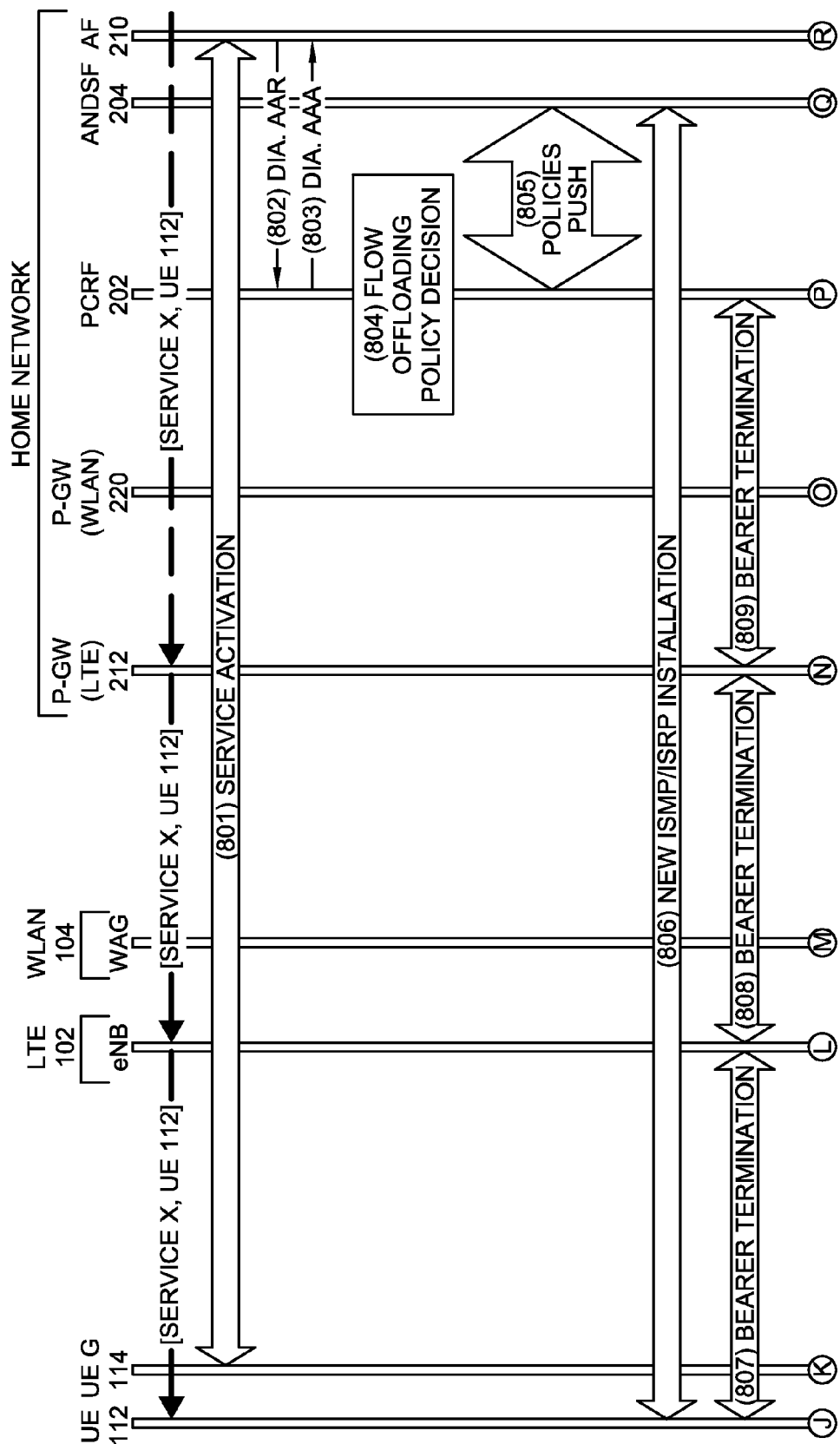
FIG. 8A illustrates a first part of an exemplary messaging flow in selecting potential user terminals to be offloaded to an alternate network in response to a service request initiated by a user terminal.
Figure 8B:
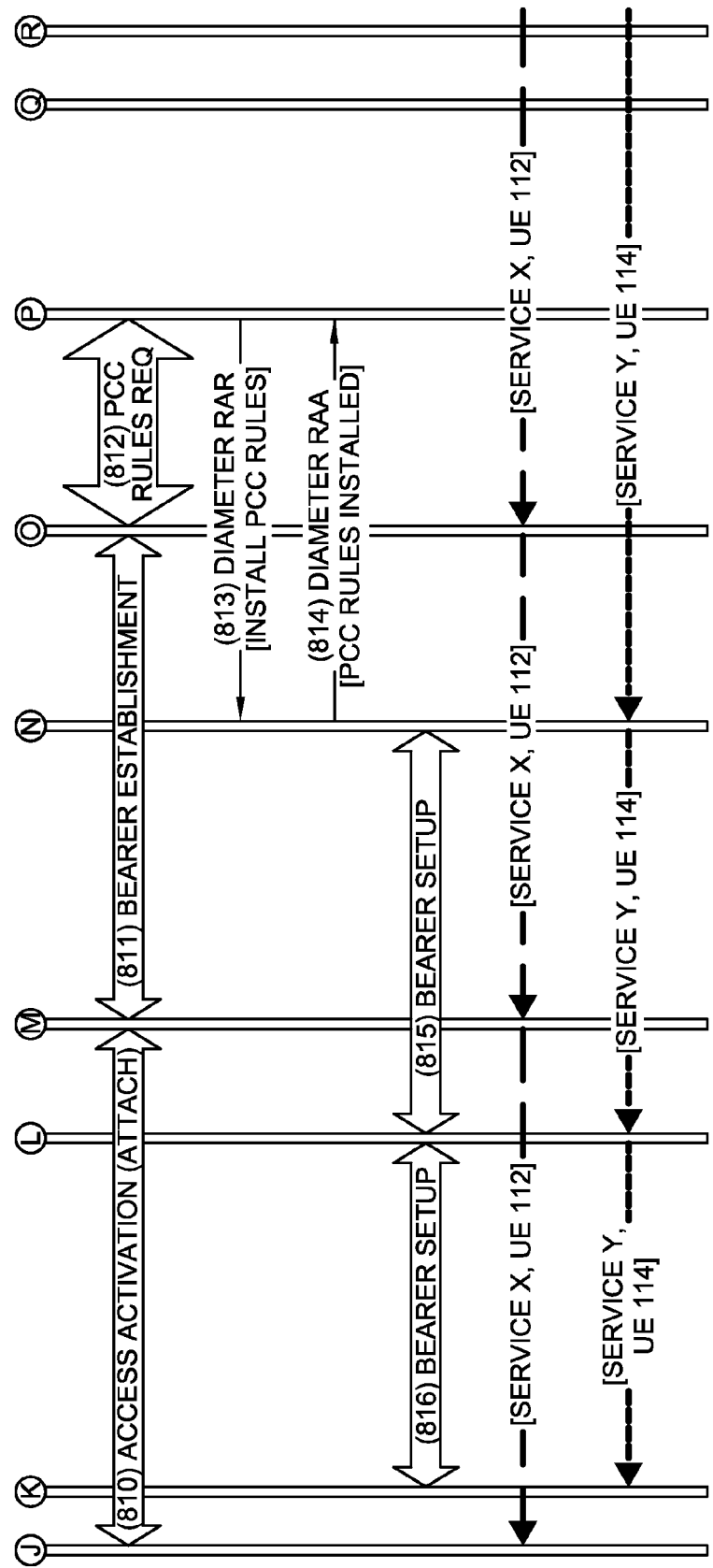
FIG. 8B illustrates a second part of an exemplary messaging flow in selecting potential user terminals to be offloaded to an alternate network in response to a service request initiated by a user terminal and FIG. 9 illustrates an exemplary Policy and Charging Rules Function.

FIGS. 8A and 8B illustrate offloading in the proactive scenario. In FIG. 8A, the user terminal 112 currently has one or more packet flows established over the LTE access network 102, depicted as a dashed line, labeled [Service X, UE 112]. The user terminal 114 attempts to establish a new multimedia streaming session. It initiates the service activation (step 801), for instance, by using Real Time Streaming Protocol to set up the media streaming flows against a streaming server (not shown). The streaming server, which implements the AF 210, reports the session details to the PCRF 202 (step 802) and receives an acknowledgement (step 803). The PCRF 202 then evaluates whether the newly requested packet flows shall be accommodated in the current access network.

The criteria for deciding whether to accommodate the newly requested packet flows may be defined by the operator. It can be based on the offloading priority of the subscriber of the user terminal 114. In some implementations, the offloading priority of the subscriber is derived from the user class it belongs to. For instance, subscribers belonging to the "gold" user class may have been allocated a very high offloading priority, and then, be permitted to remain in the current access network, while subscribers of lower user classes (e.g., "silver" and "bronze") may have been allocated lower offloading priorities and therefore, be selected as candidates for offloading. The criteria may be based on time-based factors such as peak vs. off-peak hours, work days vs. weekends, etc. For instance, operators can choose to offload packet flows to alternate access networks during peak hours when the network usage is higher, but maintain packet flows in the original access network during off-peak hours or weekends. The criteria may also depend on the current level of congestion in the area where the user terminal 114 is currently located. For example, if the access network technology makes it possible to determine the level of congestion in real time, the level of congestion can be used as input for policy decisions by the PCRF 202. Otherwise, heuristics and/or historical usage data can be used.

As a result of such evaluation, the PCRF 202 decides that it must start the offloading process to accommodate the new service request (step 804). The policy decision made in the offloading process includes a plurality of packet flows which are to be offloaded to alternate access networks. The selected packet flows belong to user terminals other than the user terminal 114.

Next, the PCRF 202 pushes the policy decision to the ANDSF 204 (step 805). The policy decision comprises one or more packet flows of one or more user terminals to be offloaded to alternate access networks. The PCRF 202 sends this information to the ANDSF in a Push Access Network Request message. The ANDSF 204 acknowledges the reception of this message and then pushes the new ISMP/ISRP (step 806) to the user terminal 112. In FIG. 8A, only the pushing to the user terminal 112 is depicted. The policy decision may determine that other user terminals may be affected.

The user terminal 112 implements the received ISMP/ISRP. In this example, ISRP dictates that the selected packet flow(s) shall be moved to the WLAN access network 104. Thus, to enforce the policy, the user terminal 112 signals dedicated bearer termination to the LTE access network 102, if applicable (steps 807 to 809). Then the user terminal 112 initiates the attachment to the WLAN access network (steps 810 to 812). Additionally, the user terminal 112 may need to perform some application level specific signaling to indicate to the AF 210 the change of access network (not shown).

The PCRF 202 derives PCC rules for the newly requested packet flow to be established by the user terminal 114 and installs them in the P-GW 212 (steps 813 and 814). The P-GW 212 initiates signaling towards the LTE access network 102 requesting the resource reservations, for example, requesting a dedicated bearer setup (steps 815 and 816). The bearer setup succeeds because of the offloading of the packet flows previously established by the user terminal 112. As the result of the offloading, the user terminal 112 has an established packet flow for service X in the LTE access network 102 (shown as solid line labeled [XERVICE X, UE 112] in FIG. 8B). The user terminal 114 has an established packet flow for service Y in the WLAN access network 114 (shown as dashed line labeled [SERVICE Y, UE 114] in FIG. 8B).

Figure 9:
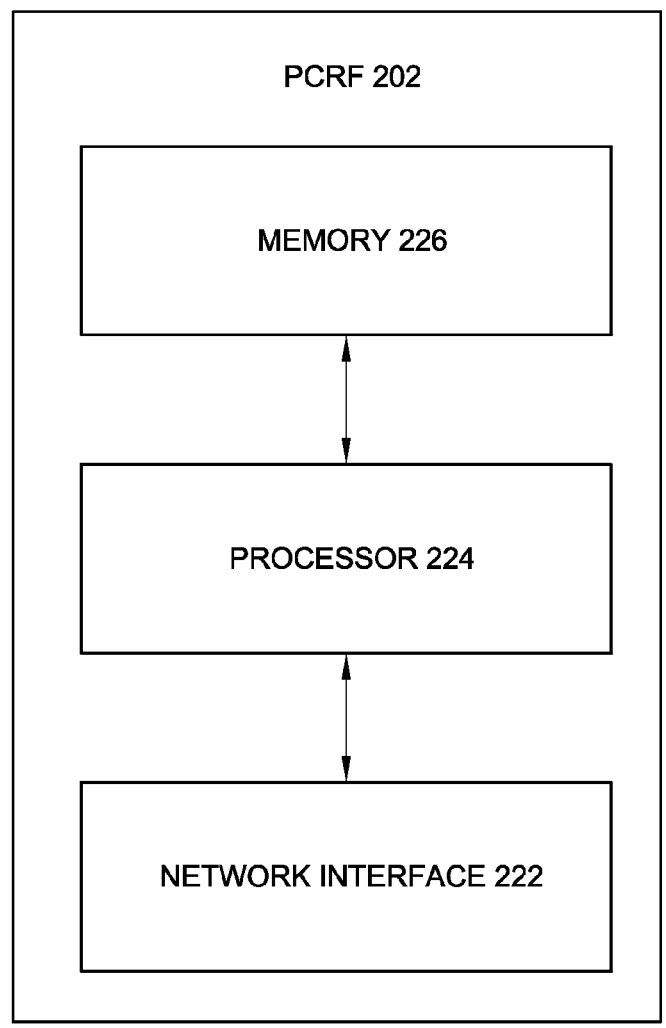

FIG. 9 illustrates the main functional components of an exemplary PCRF 202. The PCRF 202 comprises a network interface 222, processor 224, and memory 226. The network interface 222 may comprise any type of interface for connecting to a communication network, such as an Ethernet interface. The network interface 222 enables the PCRF 202 to communicate with the other nodes in the communication network 100. The processor 224 comprises the main control logic for making and implementing policy decisions as herein described. The processor 224 may be implemented by one or more microprocessors, microcontrollers, application-specific integrated circuits (ASICs), field-programmable gate arrays (FPGAs), or a combination thereof. Memory 226 stores program instructions and data needed to carry out the operations as herein described. The program instructions and data are preferably stored in a non-volatile memory, such as an electronically-erasable programmable read-only memory (EEPROM) or flash memory. Memory 226 may further include volatile memory for storing temporary data.

The present invention may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive, and all changes coming within the meaning and equivalency range of the appended claims are intended to be embraced therein.

The invention claimed is:

1. A method of making network resources available for prioritized users in a wireless communications network, said method comprising:
    identifying one or more alternate networks in a concerned area;
    identifying a list of candidate packet flows associated with user terminals with packet flows established in the wireless communications network in the concerned area, said user terminals capable of accessing at least one of the one or more alternate networks;
    selecting, amongst the candidate packet flows, one or more packet flows pertaining to lower priority user terminals; and
    offloading the selected one or more packet flows to the one or more alternate networks.

2. The method of claim 1, further comprising determining an offloading priority for each user terminal, wherein identifying user terminals with packet flows established in the wireless communications network in the concerned area that are capable of accessing at least one of the one or more alternate networks is based on the offloading priorities of the user terminals.

3. The method of claim 2, wherein identifying one or more alternate networks in a concerned area further comprises:
    sending an access network request message to an access network discovery server, said access network request message comprising a list of user terminals; and receiving an access network response message from the access network discovery server, said access network response message including available access networks for each user terminal in the list.

4. The method of claim 2, wherein identifying user terminals in the concerned area with established packet flows in the wireless communications network that are capable of accessing at least one of the alternate networks further comprises:
maintaining a list associating current packet flows with corresponding user terminals;
determining current locations of the user terminals with current packet flows;
determining access technologies supported by the user terminals with current packet flows; and
selecting, from the list of current packet flows, the user terminals in the concerned area that are capable of accessing at least one of the alternate networks based on the determined current locations of the user terminals and access technologies supported by the user terminals.

5. The method of claim 4, wherein determining current locations of the user terminals with current packet flows comprises:
sending a find location request message to a positioning server where current location information of the user terminals is available, said find location request message including a list of one or more of the user terminals with current packet flows; and
receiving a find location response message from the positioning server, said find location response message including the current location information for one or more of the user terminals included in the list.

6. The method of claim 4, wherein determining access technologies supported by the user terminals with current packet flows comprises:
sending a get device capability request message to a user agent profile server where device capabilities of the user terminals are available, said get device capability request message comprising one or more device type identifiers corresponding to the user terminals with current packet flows; and
receiving a get device capability response message from the user agent profile server, said get device capability response message comprising a list of implemented access technologies for one or more device type identifiers included in the get device capability request message.

7. The method of claim 4, wherein selecting the user terminals in the concerned area that are capable of accessing at least one of the alternate networks is further based on subscriber profiles obtained for the user terminals with current packet flows.

8. The method of claim 7, wherein the offloading priority of each user terminal is included in the subscriber profile of the user terminal.

9. The method of claim 7, wherein each of the subscriber profiles includes a user class, and wherein the offloading one or more of the packet flows established by the user terminals is based on the user classes of the user terminals.

10. The method of claim 1, wherein the method of making network resources available for prioritized users is carried out in response to a failed request by a user terminal to initiate a service due to congestion.

11. The method of claim 1, wherein the method of making network resources available for prioritized users is carried out in response to a request by a user terminal to initiate a service in the concerned area.

12. A network node for making network resources available for prioritized users in a wireless communications network, said network node comprising:
a network interface unit for exchanging information between a Policy and Charging Rule Function (PCRF) node and other network devices;
a processor configured to:
identify one or more alternate networks in a concerned area;
identify a list of candidate packet flows associated with user terminals in the concerned area with packet flows established in the wireless communications network, said user terminals capable of accessing at least one of the one or more alternate networks;
select, amongst the candidate packet flows, one or more packet flows pertaining to lower priority user terminals; and
offload the selected one or more packet flows to the identified one or more alternate networks.

13. The network node of claim 12, wherein the processor is configured to determine an offloading priority for each user terminal, and wherein the processor is further configured to offload one or more of the packet flows established by the user terminals based on the offloading priorities of the user terminals.

14. The network node of claim 13, wherein in order to identify one or more alternate networks in a concerned area, the processor is further configured to:
send an access network request message to an access network discovery server, said access network request message comprising a list of user terminals; and
receive an access network response message from the access network discovery server, said access network response message including the available access networks for each user terminal in the list.

15. The network node of claim 13, wherein in order to identify user terminals in the concerned area with established packet flows that are capable of accessing at least one of the one or more alternate networks, the processor is further configured to:
maintain a list associating current packet flows with corresponding user terminals;
determine current locations of the user terminals with current packet flows;
determine access technologies supported by the user terminals with current packet flows; and
select, from the list of current packet flows, the user terminals in the concerned area that are capable of accessing at least one of the one or more alternate networks based on the determined current locations of the user terminals and access technologies supported by the user terminals.

16. The network node of claim 12, wherein in order to determine current locations of the user terminals, the processor is further configured to:
send a find location request message to a positioning server where current location information of the user terminals is available, said find location request message including a list of the user terminals with current packet flows; and
receive a find location response message from the positioning server, said find location response message including the current location information for one or more of the user terminals identified in the list.

17. The network node of claim 15, wherein in order to determine access technologies supported by the user terminals, the processor is further configured to:
send a get device capability request message to a user agent profile server where device capabilities of the user terminals are available, said get device capability request message comprising one or more device type identifiers corresponding to the user terminals with current packet flows; and receive a get device capability response message from the user agent profile server, said device capability response message comprising a list of implemented access technologies for one or more device type identifiers included in the get device capability request message.

18. The network node of claim 15, wherein the processor is further configured to:

obtain subscriber profiles for the user terminals with current packet flows; and offload one or more of the user terminals to the one or more alternate networks based on the subscriber profiles.

19. The network node of claim 18, wherein the offloading priority of each user terminal is included in the subscriber profile of the user terminal, and wherein the offloading one or more of the user terminals to the one or more alternate networks is based on the offloading priorities of the user terminals.

20. The network node of claim 18, wherein the offloading priority of each user terminal is derived from a user class included in the subscriber profile of the user terminal.

21. The network node of claim 17, wherein the processor is further configured to offload the one or more of the user terminals in response to a failed request by a user terminal to initiate a service due to congestion.

22. The network node of claim 17, wherein the processor is further configured to offload the one or more of the user terminals in response to a request by a user terminal to initiate a service in the concerned area.

* * * * *

UNITED STATES PATENT AND TRADEMARK OFFICE
CERTIFICATE OF CORRECTION

| | | |
|---|---|---|
| PATENT NO. | : 8,797,875 B2 | Page 1 of 1 |
| APPLICATION NO. | : 13/235092 | |
| DATED | : August 5, 2014 | |
| INVENTOR(S) | : Garcia Martin et al. | |

It is certified that error appears in the above-identified patent and that said Letters Patent is hereby corrected as shown below:

In the Specification

In Column 1, Line 18, delete "Microware" and insert -- Microwave --, therefor.

In Column 3, Line 60, delete "Package" and insert -- Packet --, therefor.

Signed and Sealed this
Tenth Day of March, 2015

Michelle K. Lee
*Deputy Director of the United States Patent and Trademark Office*